United States Patent [19]

Williams et al.

[11] 3,853,816
[45] Dec. 10, 1974

[54] WATER-SOLUBLE THERMOSETTING GLYOXALATED CARBAMOYLALKYL ALKYLENEAMINO POLYMERS AND PAPER HAVING A CONTENT THEREOF

[75] Inventors: Laurence Lyman Williams, Stamford; Anthony Thomas Coscia, Norwalk, both of Conn.

[73] Assignee: American Cyanamid Company, Stamford, Conn.

[22] Filed: Aug. 20, 1973

[21] Appl. No.: 389,831

Related U.S. Application Data

[63] Continuation-in-part of Ser. Nos. 471,463, July 12, 1965, abandoned, and Ser. No. 745,486, July 17, 1968, Pat. No. 3,556,932, and a continuation of Ser. No. 107,457, Jan. 18, 1971, abandoned.

[52] U.S. Cl............... 260/72 R, 162/166, 162/167, 260/29.4 R
[51] Int. Cl............................ C08g 9/04, C08g 9/20
[58] Field of Search............................ 260/72 R, 68

[56] References Cited
UNITED STATES PATENTS

| | | | |
|---|---|---|---|
| 2,764,507 | 9/1956 | Jen et al. | 260/72 X |
| 3,329,657 | 7/1967 | Strazdins et al. | 260/72 X |
| 3,556,932 | 1/1971 | Coscia et al. | 260/72 X |
| 3,607,622 | 9/1971 | Espy | 260/72 X |
| 3,773,736 | 11/1973 | Williams et al. | 260/72 X |

*Primary Examiner*—Howard E. Schain
*Attorney, Agent, or Firm*—Evans Kahn

[57] ABSTRACT

Water-soluble cationic thermosetting polymer consisting essentially of (a) N-carbamoylalkyl alkyleneamino linkages and (b) said linkages carrying glyoxal substituents possess good wet-strengthening properties. Wet strength paper containing these polymers loses about half of its wet strength in 24 hours during normal wet weathering.

5 Claims, No Drawings

WATER-SOLUBLE THERMOSETTING GLYOXALATED CARBAMOYLALKYL ALKYLENEAMINO POLYMERS AND PAPER HAVING A CONTENT THEREOF

This is a continuation-in-part of our copending application Ser. No. 471,463 filed July 12, 1965, now abandoned and our copending application Ser. No. 745,486 filed July 17, 1968, now U.S. Pat. No. 3,556,932, and is also a continuation of our copending application Ser. No. 107,457, filed Jan. 18, 1971, and now abandoned.

The present invention relates to a new water-soluble substantially linear thermosetting water-soluble cationic polyalkylenepolyamine carrying amide and glyoxalated amide substituents, to wet strength paper having a content of said polymer, and to the processes involved in the manufacture of the polymer and the paper.

Our parent application discloses that the water-soluble ionic polymers which consist essentially of linear vinyl backbone chains carrying glyoxalated amide substituents are valuable agents for use in the manufacture of paper. The application discloses that when water-laid webs of cellulose fibers which have an absorbed content of said polymers are dried at normal temperature in the range of 190°–250°F., the polymer molecules react with the cellulose and that in addition the polymer molecules cross-link among themselves, so that the resulting paper possesses very high wet strength. An important property of the polymer and of the wet strength paper is that about half of the wet strength which the polymer imparts and which the paper possesses is temporary and disappears when the paper is soaked in water for 24 hours at room temperature.

Permanent wet strength is often an unnecessary and indeed undesirable property. The working life of paper towels, napkins and "personal" tissue is rarely more than a few minutes, and a substantial part of the national litter problem results from the fact that discarded paper remains intact for a long period of time on streets and in forests. Moreover, paper broke which possesses permanent wet strength is difficult to rework; cf. U.S. Pat. Nos. 2,394,273; 2,423,097 and 2,872,313. There is therefore a demand for high wet strength paper which retains its wet strength during brief contact with moisture but which loses much of its strength after a short period of natural weathering. Our parent application provides paper of this character.

The present invention provides a new polymer which possesses similar properties to those of our parent application including the property of imparting temporary wet strength.

The polymers of the present invention are water-soluble, essentially linear and cationic, and consist essentially of N-carbamoylalkyl alkyleneamino linkages and such linkages in glyoxalated state, the glyoxalated linkages being sufficiently numerous that the polymer is thermosetting. With ethyleneamino as an example of the alkyleneamino component, the aforesaid linkages respectively have the theoretical structures:

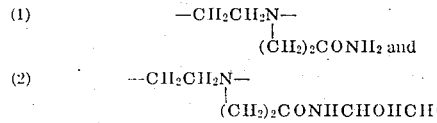

The polymer may in addition contain unmodified alkyleneamine linkages such as ethyleneamino of the theoretical formula —CH₂CH₂NH—. Broadly stated, the respective formulae are:

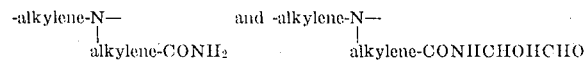

Because of the high ratio of the number of amino nitrogen atoms to the other atoms present, the polymer possesses a high net cationic charge and is therefore highly substantive to cellulose papermaking fibers in aqueous suspension.

Preferably the proportion of glyoxalated substituents is as high as is practically feasible. The glyoxal substituents produce their wet strengthening action by reaction with the cellulose and by reaction with any available aldehyde reactive components of the polymer, thereby producing a cross-linking action as a result of which a polymeric network forms on the surface of the fibers thereby providing an additional means whereby they are bound together.

The polymer may contain such linkages as are commonly present in water-soluble cationic linear polymers. These include unmodified ethyleneamino and propyleneamino linkages which occur when the parent polyalkylenepolyamine is not completely provided with carbamoylalkyl substituents.

The alkyl groups of the carbamoylalkyl substituents are of any chain length so long as the polymer is water-soluble. Carbamoylmethyl or -ethyl substituents are most conveniently prepared and provide polymers which are readily water-soluble, and are therefore preferred.

The molecular weight of the backbone polymer is not an important feature of the invention. We prefer that the molecular weight of the backbone polymer be sufficiently low so that in glyoxalated state a 10 percent by weight solution of the polymer in water is of pumpable viscosity.

The polymers of the present invention can be prepared by two distinctly different methods.

According to one method, a water-soluble linear polyalkylenepolyamine is reacted with a haloalkylamide in water or in an inert mutual organic solvent, an acid acceptor being added if desired to assist the reaction. At least about ⅔ of the amide is provided per alkyleneamine linkage in the polymer and considerably more may be provided. The amount may in fact be so large that at least some of the nitrogen atoms are converted to quaternary ammonium atoms.

The product is then reacted with sufficient glyoxal to render it thermosetting. At least about 0.05 mol of glyoxal is reacted per carbamoylalkyl substituent, as this is about the smallest amount that provides economically worthwhile wet strength. We prefer to react a much larger amount of glyoxal, for example, in the range of 0.1–0.5 mol per carbamoylalkyl substituent, as in this range and beyond it the polymer possesses better wet-strengthening properties.

The parent polyalkylenepolyamines suitable for use in the present invention are the water-soluble alkylenepolyamines, and include polyethylenimine, the similar water-soluble polymers made by reacting 3,3'-iminobispropylamine with 1,2-dichloroethane or -propane, or a water-soluble polyamidopolyalkylenepolyamine such as is formed by reacting adipic acid with diethylenetriamine in 1:1 molar ratio.

To introduce the carbamoylalkyl substituents, any soluble haloalkylamide can be used which is sufficiently water-soluble so that the parent polyalkylenepolyamine remains watersoluble when reacted therewith. Chloroacetamide and α-chloropropionamide (and their bromo equivalents) are preferred because of the ease with which they react with the polyalkylenepolyamine.

Alternatively, carbamoylalkyl substituents can be attached by reacting the parent polyalkylenepolyamine with a water-soluble α,β-vinylamide. The vinyl groupings react according to the illustrative theoretical equation

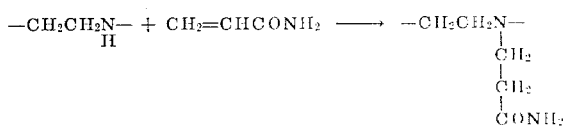

At least ⅔ of the amino nitrogen atoms should be reacted with the monomer, and best results are obtained when substantially all are so reacted.

The glyoxal reaction is performed by allowing an aqueous solution of the polymer at 15–20 percent solids containing the desired amount of glyoxal to stand at 20°C.–50°C. and pH 8–9. The reaction is halted after the viscosity of the solution has made a substantial increase and before the solution has become a gel. Only about half of the glyoxal which is added reacts, and consequently the glyoxal is added in excess. The excess does no harm and is removed with the white water in the papermaking operation.

The resulting polymer is employed as beater additive in the manufacture of paper in the same manner as water-soluble cationic thermosetting polymers have heretofore been employed in the past. The pH of the suspension as it is formed into a web is between about 4 and 8. A pH in the range of 6–8 is preferred since in this range, acid deterioration of the papermaking machine and felt is minimized or prevented, and a paper is produced which is at most little subject to acid deterioration on aging.

The wet web is dried on rolls having a surface temperature in the range of 190°F.–250°F. and most of the wet-strengthening properties of the polymer develop as the paper dries. The polymer, however, imparts wet strength even when the web is dried at room temperature.

The paper of the present invention possesses the important property of losing about half of its wet strength on short weathering (e.g., on standing for 24 hours in water at room temperature), as a result of which its capacity to cause a litter problem is greatly decreased. Moreover, it is easily reduced to discrete fibers by the ordinary action of a paper beater when it has been soaked for 8 hours in water at room temperature having a pH in excess of 9. The paper is therefore readily pulpable without the use of a special machine or special chemicals.

The invention is more fully described by the examples which follow. These examples are best embodiments of the invention and are not to be construed in limitation thereof.

EXAMPLE 1

The following illustrates the preparation of a water-soluble cationic polyalkylenepolyamine carrying unsubstituted amide groups and a sufficient number of glyoxalated amide groups to render the polymer thermosetting, by reaction of a polyalkylenepolyamide first with acrylamide and then with glyoxal. In the polymer, the alkyl groups of the carbamoylalkyl substituents are ethyl.

A solution of 262.4 g. (2 mols) of 3,3'-iminobispropylamine and 145.5 g. (1.5 mol) of 1,2-dichloroethane in 90 cc. of water is stirred with gentle heating. An exotherm occurs which carries the temperatures to about 80°C. The solution is stirred at 80°C. for 4 hours, after which the solution is diluted with 321 g. of water and adjusted to pH 8. It has a Gardner-Holdt viscosity of E.

To a 50 g. of this solution diluted with 25 g. of deionized water are added sufficient 20 percent aqueous sodium hydroxide solution to adjust the pH of the solution to 9.5, followed by 26 g. (0.365 mol) of acrylamide (equivalent to 1 mol of acrylamide per amino nitrogen atom in the polymer). The solution is heated at 70°C. for 2 hours, at which point 100 cc. of water is added and the pH adjusted to 8.2.

To this solution is added 26.5 g. of a 40 percent by weight aqueous glyoxal solution. The solution is heated at 30°C. for 20 minutes, at 40°C. for 25 minutes and 45°C. for 15 minutes until the Gardner-Holdt viscosity of the solution reaches I. The reaction is terminated by diluting the solution to 10% solids with water, adjusting the pH to 4.5 and cooling to room temperature. The polymer is thermosetting, and is substantially composed of carbamoylalkyl alkyleneamine linkages, glyoxalated carbamoylalkyl alkyleneamine linkages, and alkyleneamino linkages, wherein the alkyleneamine linkages are a 50:50 mixture of ethyleneamine and trimethyleneamine linkages.

EXAMPLE 2

The following illustrates the preparation of a polymer similar to that of Example 1 except that the linkages of the polyalkylenepolyamine are ethylenamino groups, and the alkyl substituents of the carbamoylalkyl substituents are methyl.

To 35 cc. of a 50:50 water:ethanol solution are added 43 g. (1.0 mol) of polyethylenimine and 89 g. (0.95 mol) of chloroacetamide. The mixture is heated at 60°C. with stirring and 20 percent aqueous sodium hydroxide solution is added as needed to prevent the pH from dropping below 9. After an hour the solution is cooled to 35°C. and 29 g. (0.5 mol) of glyoxal is added as a 40 percent by weight aqueous solution. The solution is allowed to stand at 35°C. and pH 8 until its viscosity has noticeably increased (about 40 minutes). The solution is then diluted to 10 percent solids with water, cooled to room temperature and adjusted to pH 4.5.

EXAMPLE 3

The following illustrates the manufacture of wet strength paper by use of a polymer of the present invention applied by the beater addition process.

To an aqueous suspension of a well-beaten 50:50 bleached hardwood:bleached softwood pulp having a consistency of 0.6 percent is added sufficient of the polymer of Example 2 to provide 0.25 percent of the polymer based on the dry weight of the fibers. The suspension is gently stirred for a minute to permit the fibers to absorb the polymer, after which the suspension is adjusted to pH 7 and formed into handsheets having a basis weight of 70 lb. per 25 inches × 40 inches/500 ream. The sheets are dried for two minutes on a rotary laboratory drum drier having a surface temperature of 235°F.

The initial wet strength of the paper is determined by clamping a strip between the jaws of a tensile strength tester spaced 2 inches apart, wetting the paper, and measuring the pull required to part the paper. The paper has a wet strength of 2.5 lb./in.

The foregoing procedure is repeated, except that the amount of the resin is doubled. The initial wet strength of the paper is 3.3 lb./in.

The wet strength of the foregoing papers on short-term weathering is determined by soaking samples of the papers in water at room temperature for 24 hours. The papers lose about half of their initial wet strength.

The suitability of the papers for pulping is determined by soaking the papers in water at pH 10 overnight at room temperature. At the end of this time the papers separate into fibers when subjected to gentle agitation.

We claim:

1. A water-soluble cationic polymer consisting essentially of N-carbamoylalkyl alkyleneamino linkages and glyoxalated N-carbamoylalkyl alkyleneamine linkages, said latter linkages being sufficiently numerous that the polymer is thermosetting, said linkages having the respective theoretical formulae

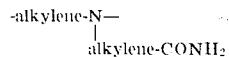

and

2. A polymer according to claim 1 comprising unsubstituted alkyleneamino linkages.

3. A polymer according to claim 1 wherein the alkyleneamino linkages are ethyleneamino linkages.

4. A polymer according to claim 1 wherein the N-carbamoylalkyl alkyleneamino linkages are N-carbamoylmethyl alkyleneamino linkages.

5. A polymer according to claim 1 wherein the N-carbamoylalkyl alkyleneamino linkages are N-carbamoylethyl alkyleneamino linkages.

* * * * *

UNITED STATES PATENT OFFICE
CERTIFICATE OF CORRECTION

Patent No. 3,853,816      Dated December 10, 1974

Inventor(s) LAURENCE LYMAN WILLIAMS and ANTHONY THOMAS COSCIA

It is certified that error appears in the above-identified patent and that said Letters Patent are hereby corrected as shown below:

Column 2 line 48. After "2/3" insert -- mol --.
Column 4 line 7. Change "polyalkylenepolyamide" to -- polyalkylenepolyamine --.

Signed and sealed this 8th day of April 1975.

(SEAL)
Attest:

RUTH C. MASON
Attesting Officer

C. MARSHALL DANN
Commissioner of Patents
and Trademarks